United States Patent [19]

Scowen et al.

[11] Patent Number: 4,832,320
[45] Date of Patent: May 23, 1989

[54] SPRING ASSEMBLIES

[75] Inventors: Geoffrey D. Scowen, Worfield; Joseph C. J. Crouch, Walsall, both of England

[73] Assignee: GKN Technology Limited, West Midlands, England

[21] Appl. No.: 270,470

[22] Filed: Nov. 9, 1988

Related U.S. Application Data

[63] Continuation of Ser. No. 27,223, Mar. 4, 1987, abandoned.

[30] Foreign Application Priority Data

Jul. 11, 1985 [GB] United Kingdom ............... 8517575

[51] Int. Cl.⁴ .................. F16F 13/00; F16F 1/26; F16F 1/36
[52] U.S. Cl. .................... 267/227; 267/148; 267/165; 267/260; 267/264
[58] Field of Search ............... 267/31, 32, 148, 36.1, 267/150, 151, 158, 164, 165, 182, 195, 227, 259, 260, 262, 264

[56] References Cited

U.S. PATENT DOCUMENTS

| 315,176 | 4/1985 | Smith | 267/36.1 |
| 662,876 | 11/1900 | Parfrey | 267/36.1 |
| 1,083,734 | 1/1914 | Dunn | 267/36.1 |
| 2,594,665 | 4/1952 | Lockwood | 267/36.1 X |
| 3,434,707 | 3/1969 | Raidel | 267/31 |
| 4,206,808 | 6/1980 | Kreft | 267/164 |

FOREIGN PATENT DOCUMENTS

| 2084691 | 4/1982 | United Kingdom | 267/165 |
| 8500207 | 1/1985 | World Int. Prop. O. | 267/148 |

Primary Examiner—Andres Kashnikow
Assistant Examiner—Richard Potosnak
Attorney, Agent, or Firm—Marshall, O'Toole, Gerstein, Murray & Bicknell

[57] ABSTRACT

A spring in the form of a strip of fibre-reinforced plastics material, of zig-zag configuration having limbs connected by reflex portions with the longitudinal centre line of the strip lying substantially in a single plane, is secured to another component by a mounting affording a socket in which a limb portion of the spring is held. Such limb portion may extend longitudinally or tranversely of the spring as a whole. Two such springs may be disposed on opposite sides of a telescopic damper, to provide an assembly useful for vehicle suspension.

12 Claims, 4 Drawing Sheets

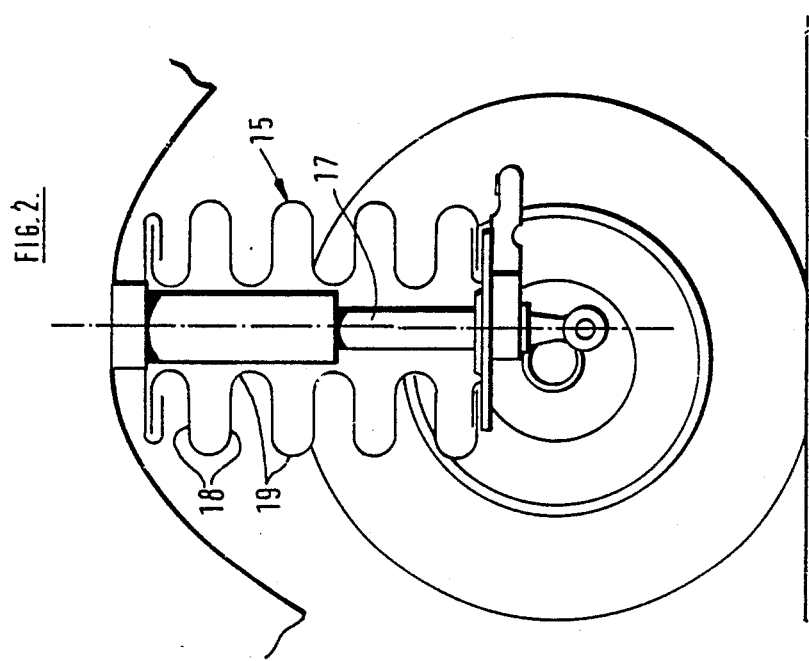
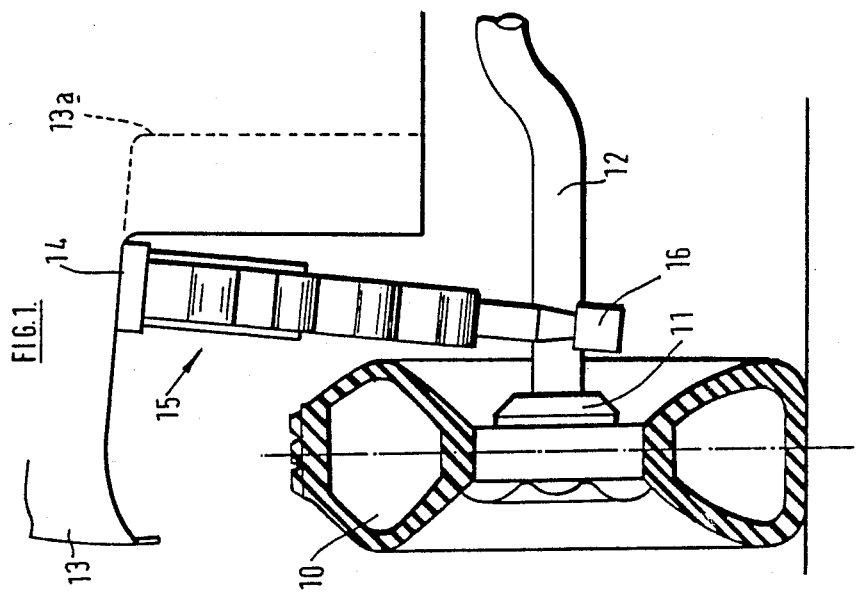

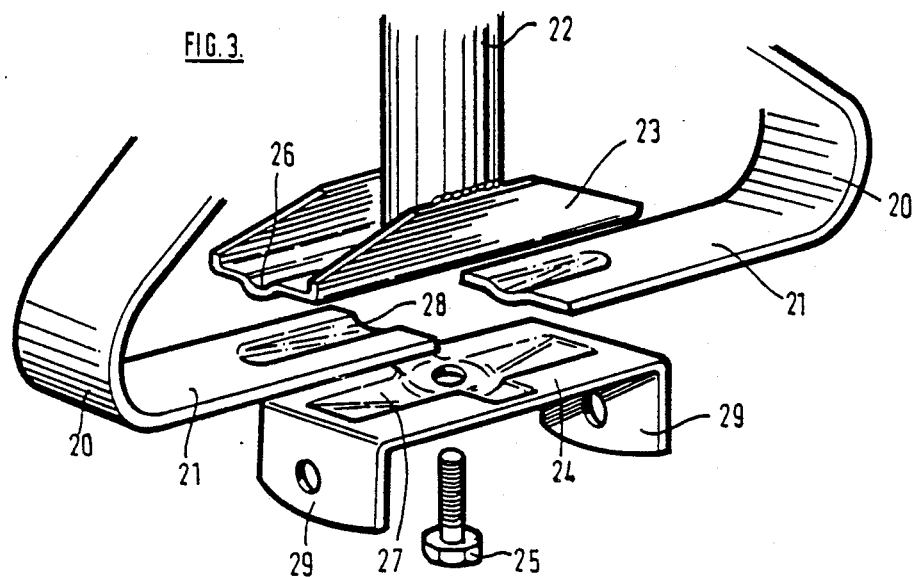
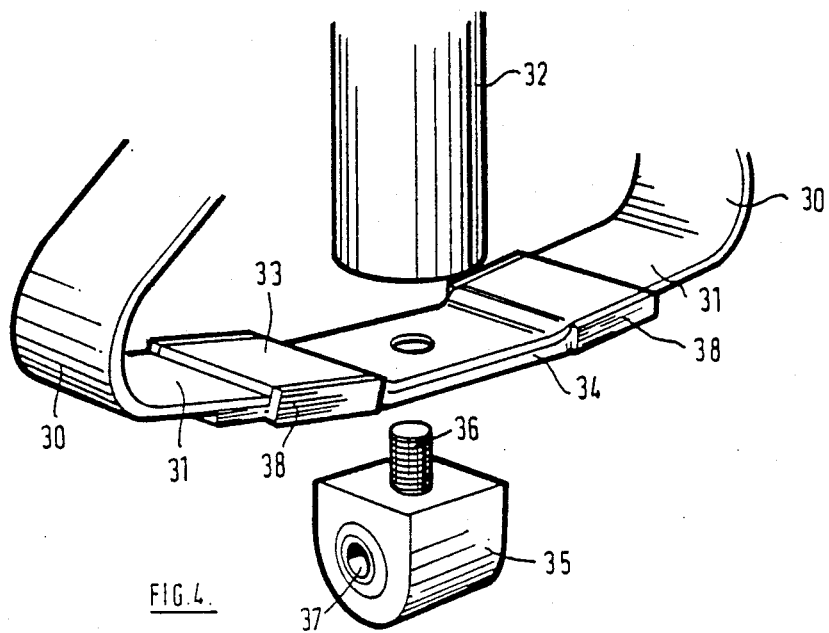

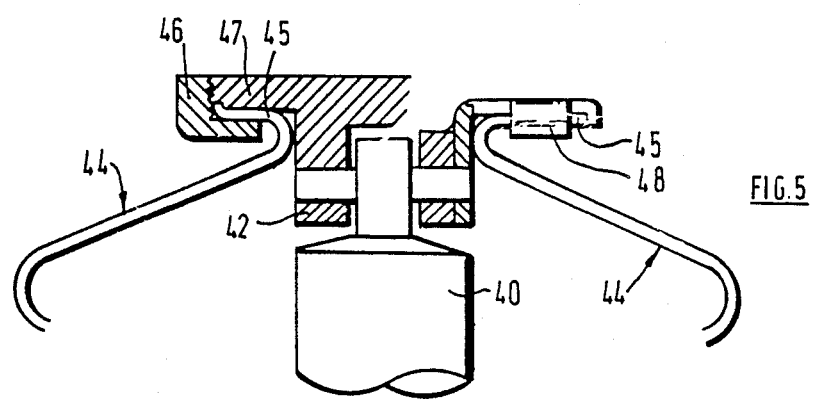
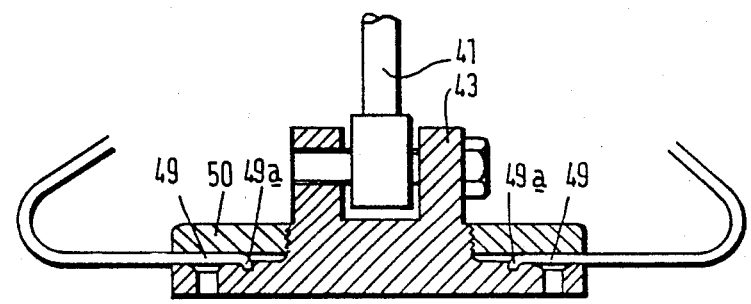
FIG.5
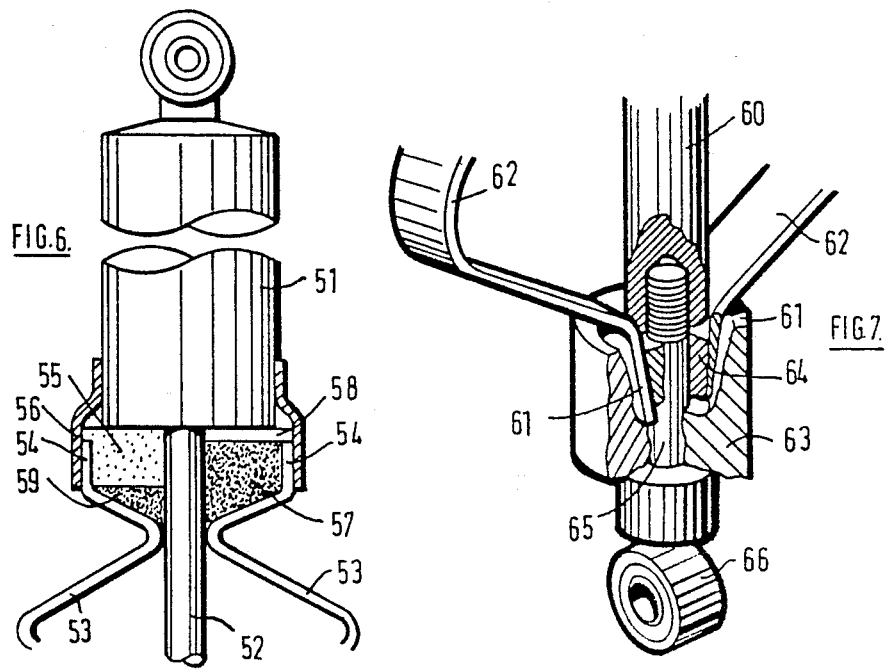
FIG.6.
FIG.7

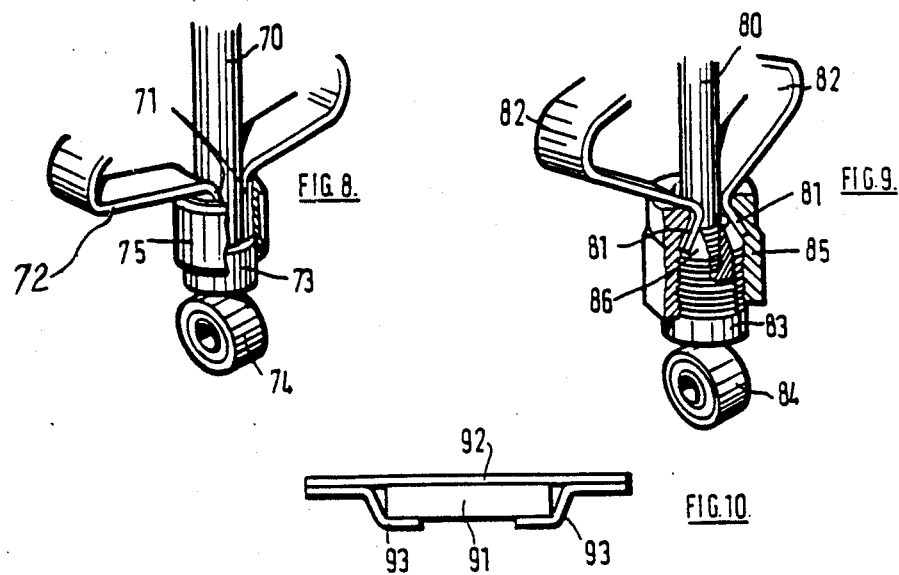
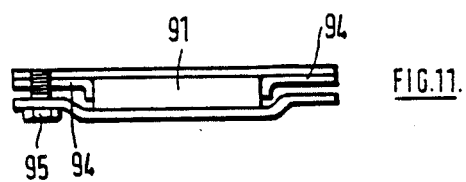
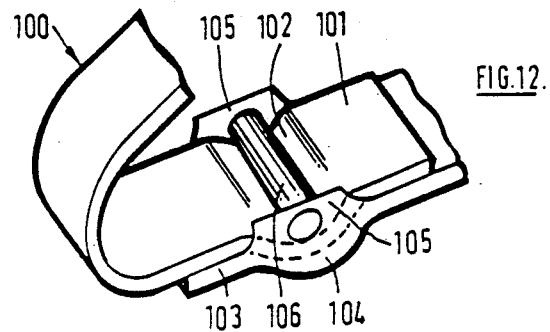

SPRING ASSEMBLIES

This application is a continuation of application Ser. No. 027,223, filed Mar. 4, 1987, now abandoned.

This invention relates to springs each comprising a strip of fibre reinforced plastics material in the form of a zig-zag, having a plurality of limbs connected by reflex portions, the longitudinal centre line of the strip lying substantially in a single plane. Such springs, which will hereafter be referred to as springs of the kind specified, are disclosed in International patent application Publication No. WO85/00207. More particularly, the invention relates to assemblies wherein such springs can be mounted for use in, for example, vehicle suspensions.

Experience with springs made of composite, fibre reinforced plastics, material has shown that one of the most difficult aspects of design associated with such springs is in respect of the means by which the springs are connected to the apparatus or equipment where they are to be used. This is the case whatever the configuration of the springs, including springs of the kind specified. It is the broad object of the present invention to provide assemblies wherein such connection of springs of the kind specified is effectively made. It is an object of a further aspect of the invention to provide an assembly of springs of the kind specified which is advantageous for use in vehicle suspensions.

According to the invention, we provide an assembly comprising a spring of the kind specified and a mounting at an end thereof comprising means affording a socket in which a limb portion of the spring is held.

The limb which is held in the socket may comprise one of said zig-zag limbs of the spring, extending generally transversely of the spring considered as a whole, or may be a limb portion extending generally longitudinally of the spring considered as a whole.

By holding a limb of the spring in a socket, expedients such as drilling or moulding apertures in parts of the spring to receive bolts or other mounting elements are avoided. The provision of apertures is generally undesirable in springs of composite material because of the general disruption caused thereby in the continuity and disposition of the fibres of the material, increasing both fatigue or notch sensitivity, and fabrication and manufacturing complexity.

The socket may be afforded by elements secured together to clamp the limb of the spring between them. An elastomeric element or elements may be interposed between the spring limb and socket, to provide a degree of resilience in the mounting and assist in spreading of loads which otherwise may be applied at small areas of contact with the spring.

The socket may completely embrace the limb of the spring or part thereof, having upper and lower wall portions constraining upper and lower surfaces of the limb and side wall portions constraining side surfaces of the limb. Alternatively, the socket may be open at its sides but may have a cross-sectional shape which interfits with the limb to constrain the limb laterally within the socket.

In embodiments described hereafter, two springs of the kind specified may be assembled with a shock absorber (damper) of telescopic type, one spring at each side of the damper, preferably in mirror image of one another, disposed such that the centre lines of the strips constituting the springs, and the telescopic axis of the damper, occupy a common plane. Such an arrangement presents advantages in terms of the space occupied by the assembly, and thus is advantageous for use in vehicle suspensions, as will be described hereafter.

A further advantage of the use of springs in such an arrangement in vehicle suspension is that the requirement for separate bump stops to determine the limit in one direction of wheel movement relative to the vehicle structure can be eliminated. Springs of the kind specified automatically provide a limit on their compression by virtue of reaching the state where the limbs of the spring abut one another.

In such an assembly of springs and damper, elements associated with the damper at each end thereof may afford respective sockets for receiving limb portions at the ends of the springs. The elements affording the sockets may be fast with respective relatively movable parts of the damper, so that the deflection of the spring in service is simply longitudinal compression and relaxation, considering the spring as a whole. To accommodate geometrical changes in typical motor vehicle suspensions, such damper parts must be pivotally connected to relatively movable parts of the vehicle suspension. Such connection of the springs to relatively movable parts of the damper eliminates the need for mountings of the springs themselves to the vehicle structure and suspension parts, separate from the damper mountings. This can simplify the vehicle structure, and is advantageous in simplifying manufacture of vehicles in respect of the fitting of suspension parts thereof.

However, in a further embodiment described hereafter the elements affording the sockets may be rigidly connected to respective parts of the vehicle suspension, with the damper pivotally connected therebetween. In this case, the deflection which the spring undergo in service is a more complex one involving bending and/or twisting of the spring as a whole, but enabling some stiffening in the lateral plane of the suspension assembly.

The invention will now be described by way of example with reference to the accompanying drawings, of which:

FIGS. 1 and 2 are respectively rear and side elevations of an assembly according to the invention, used in a motor vehicle suspension;

FIG. 3 is a perspective view of an embodiment of spring mounting in an assembly according to the invention;

FIGS. 4 to 9 are views showing further embodiments of mounting according to the invention;

FIGS. 10 and 11 are sections through details of mounting according to the invention;

FIG. 12 is a perspective view of part of a further embodiment of mounting according to the invention.

Referring firstly to FIGS. 1 and 2 of the drawings, there is shown, in diagrammatic form only, part of a suspension of the rear wheels of a motor vehicle, particularly a passenger car. A wheel 10 is carried by a wheel carrier 11, which is connected by an axle beam 12 to a corresponding wheel carrier (not shown) at the opposite side of the vehicle. The axle beam is connected to the vehicle chassis or body structure, indicated generally at 13, by suitable links, not shown, to constrain the axle beam to a required path of motion relative to the vehicle structure. Springing and damping of wheel movement relative to the vehicle structure is provided, at each side of the vehicle, by a spring and damper (shock absorber) assembly indicated generally at 15. The spring damper assembly at its lower end is pivotally connected to the wheel carrier 11 by a pivotal mounting assembly 16, and at its upper end it is connected to the structure of the vehicle by a suitable flexible mounting 14.

The spring-damper assembly 15 comprises a telescopic damper which is indicated diagrammatically at 17 and two springs one at each side thereof. Each spring comprises a strip of fibre reinforced plastics material, in the form of a zig-zag having a plurality of limbs 18 extending generally transversely of the spring as a whole, the limbs being connected by reflex portions 19. It will be noted that the two springs are disposed relative to the damper unit as mirror images of one another, in such a way that the centre lines of the strips of fibre reinforced plastics material forming the springs occupy a common plane with the axis of the damper 17. The assembly of springs and damper is thus relatively slim in the direction generally parallel to the side of the wheel 10, i.e. transversely of the vehicle. This is an advantage in terms of ease of incorporating the assembly in a motor vehicle where space is constricted. In FIG. 2, it can be seen that if the spring-damper assembly were not so slim in the direction transversely of the vehicle, a recess as 13a would have to be provided to accommodate the assembly.

A further advantage of such a spring damper assembly is that, by virtue of the small space it occupies in the direction transversely of the vehicle, it can be disposed such that it acts very close to the wheel. Roll stiffness of the suspension is thus relatively increased for a given bump stiffness, when an axle beam is used. Further, the springs are relatively light in weight as compared with coil springs.

Referring now to FIG. 3 of the drawings, this shows one arrangement by which the springs may be mounted, at their one ends, in a spring-damper assembly. In FIG. 3, end reflex portions of the two springs are indicated at 20, and end limbs, extending transversely of the springs towards one another, at 21. The lower part of the damper is indicated at 22, and has secured to it a transversely extending pressed sheet metal element 23. A further pressed sheet metal element 24 is secured to the damper 22 by a bolt 25, to define a socket receiving the end limbs 21 of the springs. The elements 23, 24 contact respectively upper and lower surfaces of the limbs 21, and when the bolt 25 is tightened the limbs are clamped therebetween. To ensure the limbs do not move laterally out of the socket, the sheet metal elements have respective projections and recesses 26, 27 which interfit with formations 28 in the limbs 21. The element 24 has downwardly turned end portions 29 apertured to receive a suitable fastener or fasteners to enable the assembly to be secured to, e.g. a wheel carrier member or other suspension component.

Referring now to FIG. 4 of the drawings, this shows an assembly similar to that of FIG. 3, wherein lower end reflex portions and limbs of the springs are indicated at 30, 31 and the lower end of a damper unit at 32. In this case, however, sockets for receiving the limbs 31 are defined by upper and lower pressed sheet metal elements 33, 34 secured together and to the damper by a member 35 having a stud 36 engageable with a threaded bore at the bottom of the damper, and further having an aperture 37 for a fastener. The lower sheet metal element 34 has upstanding side wall portions 38 which engage the sides of the limbs 31. The limbs are thus constrained on all sides by the sockets in which they fit and there is no need to provide the limbs with formations as 28 in the FIG. 3 embodiment. In an alternative contruction, damper part 32 could be directly welded to the upper pressed sheet metal element 33. In a further modification, instead of a separate upper sheet metal element 33, parts of element 34 could be bent over to engage the upper surfaces of spring limbs 31.

Referring now to FIG. 5 of the drawings, this shows diagrammatically a complete spring damper assembly. The damper comprises upper and lower telescopically engaged and movable parts 40, 41, pivotally secured respectively to upper and lower mounting members 42, 43. Springs 44, symmetrically disposed on opposite sides of the damper, are rigidly connected to the mounting members 42, 43. The result is that when the assembly is in use in a motor vehicle, with the lower mounting member 43 connected to a suitable movable suspension part and the upper mounting member 42 connected to the vehicle structure, the springs undergo a complex mode of deflection which may include bending or twisting in several directions as well as compression and relaxation generally lengthwise of the springs. This is a consequence of typical geometries of suspensions used in motor vehicles, and is to be contrasted with the arrangements hereinbefore and after described wherein end parts of the springs are connected to damper parts which by virtue of the damper construction are constrained to move linearly relative to one another.

At the upper mounting member 42, FIG. 5 shows two alternative ways in which limbs of the springs 44 may be held in sockets afforded by the mounting member. At the left hand side of the drawing, a limb 45 is held by an annular cap 46 which is screw-threaded to a base portion 47 of the mounting member. In the right hand side of the drawing, a similar limb 45 is held by a "U" or saddle shaped structure 48 of sheet metal, secured to mounting member 42.

At the lower mounting member 43, limbs 49 of the spring, extending towards one another, are held by a cap 50 of annular form, screw-threaded to a base portion of the mounting member 43. It will be noted that the free ends of limbs 49 have flanges 49a, which interfit with the base portion of the mounting member 43 to ensure that the limbs cannot become disengaged by moving radially outwardly therefrom.

Referring now to FIG. 6 of the drawings, this shows an assembly comprising a damper with upper and lower telescopically movable parts 51, 52 and two springs 53. The springs at their upper ends are connected at the lower end of the damper part 51, i.e. the springs do not extend the full length of the damper. The springs 53 have end limbs 54 extending generally lengthwise of the springs, and these are received in socket parts afforded by an annular member 55 and sleeve 56 secured to the damper part 51. Elastomeric elements are used to abut parts of the spring limb, and once again different arrangements thereof are shown in the left hand and right hand sides of the drawing. In the left hand side of the drawing, a relatively small elastomeric element 59 is used to provide an abutment for the spring limb adjacent limb 54, whereas in the right hand side of the drawing a large elastomeric element 57 also affords the radially innermost boundary of the socket receiving the spring limb 54. The end limb 54 abuts a plate 58. Dampers are usually cylindrical, and the parts 55, 56, 57, 58 of circular shape viewed lengthwise of the damper. However, these parts affording the socket for receiving the limbs of the spring could be square or rectangular in shape thus viewed.

Referring now to FIG. 7, this shows a lower part 60 of a damper, and two limbs 61 extending generally lengthwise of springs 62. The spring limbs fit within a frusto-conical socket defined by an outer element 63 and an inner elastomeric bush 64, held together by a bolt 65 having a mounting eye 66 at its end.

FIG. 8 shows, as for FIG. 7, a lower part of 70 of a damper unit and springs 72 with limbs 71 at their ends, extending generally longitudinally of the springs. The damper part 70 has an end fitting 73 with an eye 74. An annular socket is defined by a collar 75 fitted over the end fitting 73, and the limbs 71, which are of part cylindrical configuration, are held in such socket by use of a suitable adhesive.

FIG. 9 of the drawings shows a lower part 80 of a damper and two springs 82 having end limbs 81 which are of frusto-conical configuration, diverging from one another towards their free ends. The damper has an end fitting 83 with an eye 84, and a collar 85 is screw-threaded to the outside of the end fitting. Limbs 81 are held in a frusto-conical socket defined between a frusto-conical surface 86 on the end fitting 83, and a corresponding surface in the collar 85.

FIGS. 10 and 11 of the drawings show two arrangements whereby spring limbs may be rigidly secured to parts such as vehicle body members or suspension components. In FIG. 10, a limb 91 of a spring is held in a socket defined by a panel 92 forming part of the vehicle structure, and pressings 93 secured thereto. In FIG. 11, the same principle is used but additional pressings 94 abut side surfaces of the spring limb to ensure lateral location of the spring. Fastening elements such as bolts 95, rivets or the like are used to hold the assembly to the vehicle structure.

Referring now to FIG. 12 of the drawings, there is shown a spring 100 having an end limb 101 which is shaped to present a part-cylindrical recess 102 extending transversely of the limb. The spring limb is held by a socket part 103 which includes a portion 104 defining a transverse recess in which the part 102 of the spring lies. Upstanding wall portions 105 abut the edges of the spring portion 102, to prevent lateral movement thereof, and a pin 106 extending between the wall portions 105 holds the spring in position. The spring is thus effectively held both lengthwise and transversely of the limb 101. If the pin 106 is readily removable, the spring itself may be readily detached from its mounting, if required.

It will be appreciated that the above embodiments of the invention are described by way of example only, and the principles thereof may have detail differences applied to them. Further, features of the individual embodiments may, in certain circumstances, be combined with one another to provide different embodiment of mounting within the scope of the invention.

We claim:

1. A motor vehicle comprising a vehicle body/chassis structure:
   a road wheel carried by a wheel carrier member;
   a suspension linkage connecting the wheel carrier member to the vehicle structure;
   and a spring and damper assembly comprising a damper of telescopic type having two parts telescopically movable relative to one another along an axis; only two springs disposed in mirror image of one another on opposite sides of the damper; each said spring comprising an elongate strip of fibre-reinforced plastics material with a centre line extending along the surface length of the strip, the strip being disposed in the form of a zig-zag with a plurality of limbs interconnected by reflex portions such that the centre line of the strip lies substantially in a single plane; the centre lines of the strips constituting the two springs and the telescopic axis of the damper lying substantially in a common plane; and respective mounting means connected to each said damper part, and affording sockets in which end portions of said limbs of the springs are held;
   said spring and damper assembly being disposed in a generally upright orientation with said parts of the damper being connected respectively to the vehicle structure and to the wheel carrier member, said two springs being disposed with one forwardly and the other rearwardly of said damper.

2. A motor vehicle comprising a vehicle body/chassis structure:
   means carrying a road wheel for movement relative to the vehicle structure; and
   a spring and damper assembly comprising a damper of telescopic type having two parts telescopically movable relative to one another along an axis; only two essentially identical springs disposed so as to be on opposite sides of the damper; each said spring comprising an elongate strip of fibre-reinforced plastics material with a centre line extending along the surface length of the strip, the strip being disposed in the form of a zig-zag with a plurality of limbs interconnected by reflex portions such that the centre line of the strip lies substantially in a single plane; the centre lines of the strips constituting the two springs and the telescopic axis of the damper lying substantially in a common plane; and respective mounting means connected to each said damper part; and affording sockets in which end portions of said limbs of the springs are held;
   said spring and damper assembly being disposed in a generally upright orientation with said parts of the damper being connected respectively to the vehicle structure and to the means carrying the wheel, said two springs being disposed with one forwardly and the other rearwardly of said damper.

3. A motor vehicle comprising a vehicle body/chassis structure:
   a road wheel carried by a wheel carrier member;
   a suspension linkage connecting the wheel carrier member to the vehicle structure;
   and a spring and damper assembly comprising a damper of telescopic type having two parts telescopically movable relative to one another along an axis; only two springs disposed in mirror image of one another on opposite sides of the damper; each said spring comprising an elongate strip of fibre-reinforced plastics material with a centre line extending along the surface length of the strip, the strip being disposed in the form of a zig-zag with a plurality of limbs interconnected by reflex portions such that the centre line of the strip lies substantially in a single plane; the centre lines of the strips constituting the two springs and the telescopic axis of the damper lying substantially in a common plane; and respective mounting means connected to each said damper part, and affording sockets in which end portions of said limbs of the springs are held;

said spring and damper assembly being disposed in a generally upright orientation with said parts of the damper being connected respectively to the vehicle structure and to the wheel carrier member, said common plane extending lengthwise of the vehicle.

4. An assembly according to claim 1 wherein said limb which is held in the socket comprises one of the zig-zag limbs of the spring, extending generally transversely of the spring considered as a whole.

5. An assembly according to claim 1 wherein said limb which is held in the socket comprises a portion of said strip, extending generally longitudinally of the spring as a whole.

6. An assembly according to claim 1 wherein said socket is afforded by elements secured together to clamp said limb of the spring between them.

7. An assembly according to claim 1 wherein said socket comprises upper and lower wall portions constraining upper and lower surfaces of the limb therein, and said wall portions constraining side surfaces of said limb.

8. An assembly according to claim 1 wherein said socket comprises upper and lower wall portions constraining upper and lower surfaces of the limb therein, and is of a cross-sectional shape which interfits with said limb to constrain the limb laterally within the socket.

9. An assembly according to claim 1 wherein said socket affords a formation extending transversely of said limb, with which said limb interfits to resist movement thereof lengthwise of the socket.

10. An assembly according to claim 9 wherein said formation comprises a part-cylindrical recess with which a complementary portion of the limb, spaced from the free end thereof, engages.

11. An assembly according to claim 1 wherein said mounting means are fast with said two parts of the damper.

12. An assembly according to claim 1 wherein at least one of said mounting means is pivotally connected to the respective damper part and is adapted to be connected to a vehicle part.

* * * * *